United States Patent [19]

Murphy et al.

[11] Patent Number: 4,956,741
[45] Date of Patent: Sep. 11, 1990

[54] SOLID-STATE TRIP UNIT FOR DC CIRCUIT BREAKERS

[75] Inventors: William J. Murphy; Joseph C. Engel, both of Monroeville, Pa.

[73] Assignee: Westinghouse Electric Corp., Pittsburgh, Pa.

[21] Appl. No.: 375,301

[22] Filed: Jul. 3, 1989

[51] Int. Cl.$^5$ .............................................. H02H 3/08
[52] U.S. Cl. .......................................... 361/95; 361/97
[58] Field of Search .......................... 361/86, 87, 92, 93, 361/94, 95, 96, 97

[56] References Cited

U.S. PATENT DOCUMENTS

| 4,266,259 | 5/1981 | Howell ................................ 361/97 |
| 4,351,012 | 9/1982 | Elms et al. ........................ 361/97 X |
| 4,423,458 | 12/1983 | Stich ................................ 361/93 |
| 4,492,941 | 1/1985 | Nagel ................................ 335/13 |
| 4,743,875 | 5/1988 | Murphy ............................. 335/18 |
| 4,788,620 | 11/1988 | Scott ................................ 361/97 X |

Primary Examiner—Derek S. Jennings
Attorney, Agent, or Firm—Charles M. Lorin

[57] ABSTRACT

A contactor includes two DC sensors within the housing which are isolated from the tripping unit, from the power supply and from each other by the combination of a transformer and photoelectric coupling, the sensed signals being pulse width modulated and demodulated on the respective sides of the photoelectric coupling barrier.

6 Claims, 9 Drawing Sheets

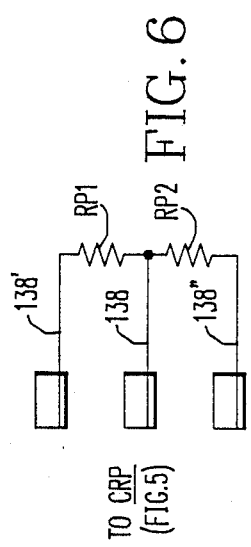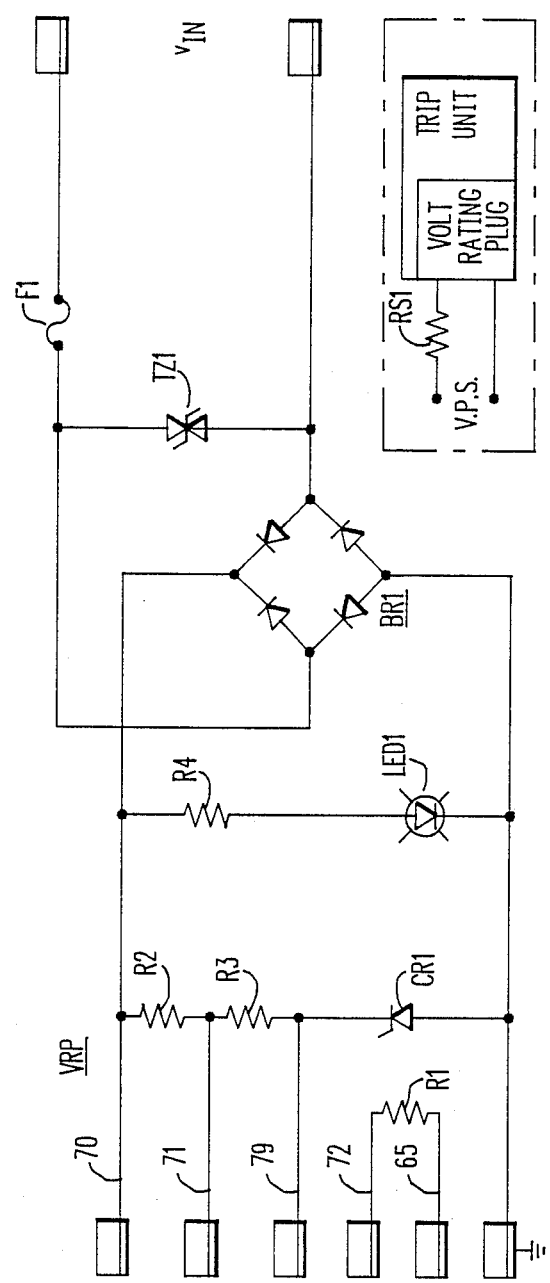
FIG. 6
FIG. 8

4,956,741

SOLID-STATE TRIP UNIT FOR DC CIRCUIT BREAKERS

FIELD OF INVENTION

The invention relates to contactors and circuit breakers of the DC sensing type, namely, where the line to be interrupted for protection of the load is a DC current line.

BACKGROUND OF THE INVENTION

This type of circuit breaker involves DC sensing, a function which is preferably carried out by a sensor placed within the housing of the circuit breaker. As shown in U.S. Pat. No. 4,743,875 of William J. Murphy, it is known to design a DC shunt so that it can be placed entirely within the confines of the housing of the circuit breaker.

A circuit breaker of the DC type is generally provided with one or more poles. Multiple poles, or contacts, are used in respective sections of the DC line so as to insure more reliability. Although the DC sensing function may be associated with one pole, it is known, from U.S. Pat. No. 4,492,941 of Harry H. Nagel, to place DC sensing devices on the respective such poles of a circuit breaker, the object of such parallelism being also to increase the overall reliability.

A circuit breaker generally includes a trip unit comprising: 1/ a section (INSTANTANEOUS) which responds instantaneously to any overcurrent of the sensed DC line exceeding a predetermined critical level, i.e. as require instantaneous protection, like at startup; 2/ a section (SHORT-TIME which tolerates high currents for short periods of time without tripping as prescribed by a short-time pickup level of the current sensed and generally predicated upon an inverse-time relationship of the sensed current; and 3/ a section (LONG-TIME) establishing a long-term delay, generally predicated on the square of the current.

See for instance: U.S. Pat. Nos. 4,266,259 and 4,423,458.

Tripping and DC sensing are functions which preferably have been placed within the housing of the circuit breaker. The afore-stated Murphy patent is illustrative of a DC sensing function designed so that it can be placed entirely within the housing of the circuit breaker, or contactor. So is the trip unit function preferably placed entirely within such common housing. Another function required on the circuit breaker is the power supply. A power supply and converter are also used to provide potential and current for the components of the circuitry. It is also desirable that such power supply and converter be placed within the housing and in proximity to the tripping unit. A problem arising from interconnecting power supply, sensing elements and the trip circuit is electrical isolation. In this regard, there are two components of electrical circuitry which are known to provide good electrical isolation. One is the transformer. It involves the transmission of power and current. The other is photo-electric coupling. The latter involves essentially the transmission of signals. The object of the present invention is to combine these two types of electrical isolation functions for providing an improved and more compact integration of the power supply, DC sensing and tripping unit functions within a circuit breaker and, more specifically, all within a common housing.

SUMMARY OF THE INVENTION

The invention resides in a circuit breaker including within a common housing at least one DC current sensor, the sensor or sensors being electrically isolated from the power supply and the tripping unit supplied by it. To this effect, the line current representative signal derived from the sensor is passed through a pulse-width modulator outputting into a photo-electric coupler which inputs into a pulse-width demodulator generating a true representation of the sensed current which is in turn inputted into a tripping unit.

More specifically, the DC current sensor is photo-electrically coupled to the tripping unit for transmission thereto of a signal representative of the sensed DC current, the sensed DC current is converted to a pulse-width modulated (PWM) signal before such photo-electrical transmission and such pulse-width modulated (PWM) signal is demodulated after such transmission, the pulse-width modulation and demodulation functions being effected in relation to a DC voltage derived from said power supply through a transformer, whereby the tripping unit is responsive to a DC current representative signal derived after demodulation which is unaffected by any variation in the voltage applied by the power supply, and the DC current sensor remains isolated by the transformer from the power supply and the tripping unit.

According to another aspect of the invention, the circuit breaker is a two-pole breaker including two DC current sensors generating corresponding current representative signals, with the provision of corresponding PWM modulators passing PWM signals to respective photo-coupling units and the provision of corresponding PWM demodulators responsive to the respective said photo-coupling unit for inputting the demodulated signals to the tripping unit. More specifically, auctioneering means is provided so that a single and overriding demodulated signal is applied to the tripping unit at a time.

BRIEF DESCRIPTION OF THE DRAWINGS

FIG. 6 shows the current rating plug, the resistors to be selected being chosen in relation to a table indicating specific values for the current rating;

FIG. 8 illustrates the organization of the voltage rating plug of FIG. 7.

DESCRIPTION OF THE PREFERRED EMBODIMENT OF THE INVENTION

Figure 1:
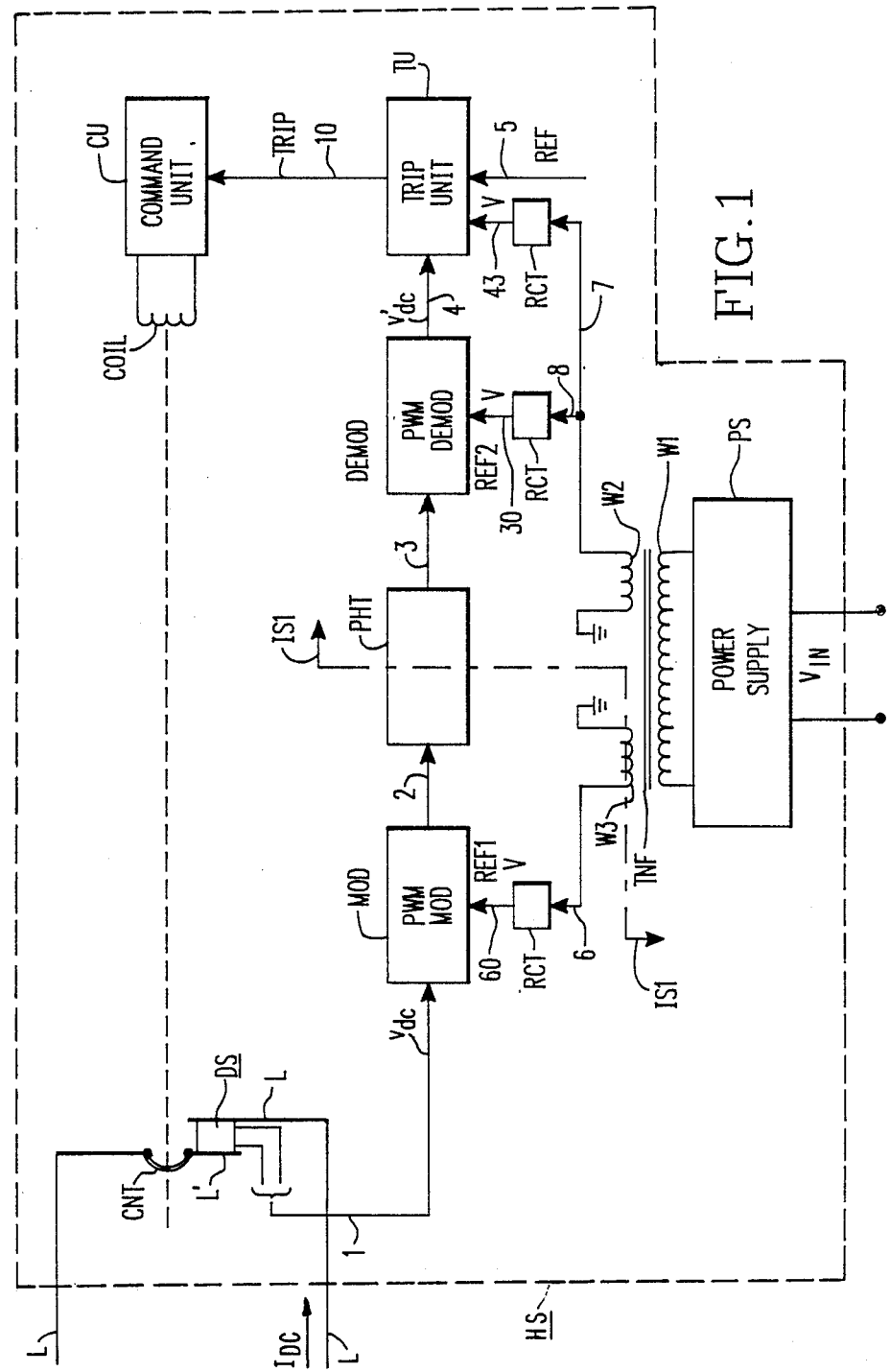
FIG. 1 is a block diagram illustrating the DC sensing circuit used, according to the present invention, for generating a DC current representative applied to the tripping unit of a circuit breaker.

Referring to FIG. 1, a contactor is shown to include contacts CNT electrically joining, when closed, two conductor terminals belonging to a DC current line L and controlled to be opened by a coil deenergized whenever a command unit CU is controlled on line 10 by a trip unit TU. The DC current passing in line L is sensed by a DC shunt DS consisting in a sensor sandwiched after the contacts CNT between an extension therethrough L' of the line and the continuation of the line L. The sensor is, preferably a laminated manganin sensor as described in U.S. Pat. No. 4,743,875. This patent is hereby incorporated by reference. The sensor provides on line 1 a voltage signal $v_{dc}$ which is representative of the DC current $I_{DC}$ passing in line L. It is desirable to maximize and assemble for compactness the number of required electrical components to be associated with the circuit breaker and that can be placed within the circuit breaker housing for superior and more reliable operation. In this respect, one object of the invention is to install the current sensor DS, the power supply PS for the tripping unit and the tripping unit TU within the housing HS while providing electrical isolation for the current sensor. The latter is done with photocoupling at PHT and with a transformer TNF coupling the power supply to the trip unit circuit and the current sensor. The sensed signal of line 1 ($v_{dc}$) is converted by a pulse-width modulator MOD into a pulse-width modulated signal (line 2) passed through the photocoupling, and the passed pulse-width modulated signal (line 3) is reconverted by a pulse-width demodulator DEMOD into a sensed current representative signal, on line 4 ($v'_{dc}$). The power supply applies a square-wave voltage to the primary winding W1 of transformer TNF, whereas the secondary winding W2 generates a square-wave current on line 7 which is applied, via line 7, to a rectifier RCT generating on line 43 a voltage which is the basic voltage V for the circuit components of the trip unit TU. Transformer TNF has another secondary winding W3 which supplies the square-wave current by line 6 to a rectifier RCT providing on line 60 a basic voltage for the triangular wave generation within the pulse-width modulator MOD. Therefore, photocoupling PHT and transformer TNF provide along line IS1 of FIG. 1 electrical isolation for the current sensor from both the power supply and the tripping unit TU. While it is generally known in a circuit breaker to pass a logic state command signal through photo-coupling (see for instance U.S. Pat. No. 4,456,867 of George T. Mallick), it is now proposed to transmit a DC current representative signal over a photo-coupler to a trip unit without impairing the quality of the signal. Pulse-width modulating at MOD the DC sensed signal $v_{dc}$ of line 1, then, passing the outputted pulse-width signal of line 2 through photo-coupling device PHT, and effecting reconversion through pulse-width demodulator DEMOD, require a power supply providing a constant DC voltage V on the MOD and DEMOD circuits so as to generate triangular waves having the same characteristics, not to affect the width of the signal of line 2, nor the magnitude of the resulting signal $v'_{dc}$ of line 4, since the sensed signal of line 1 is small and highly sensitive to line current variations. Therefore, it is important that the tripping value of line 4 be valid at all times. The DEMOD circuit is fed with a voltage V provided, from the square wave current of winding W2 and line 7, by another rectifier RCT responding to line 8 and outputting on line 30 the voltage V. In principle, the same voltage V is obtained on lines 60, 30 and 43. However, this voltage may vary in amplitude, and this would affect the value of the signal of line 2 after PWM modulation by MOD. As will be shown by reference to FIG. 2, any effect on line 6 due to voltage variation in the power supply will be incurred on line 8 and the common effect on V will be for demodulator DEMOD in the pulse-width demodulation process the inverse of what it is for the modulator MOD in the pulse-width modulation process, because W2 and W3 will track the same voltage variation in the power supply PS.

Figure 2A:
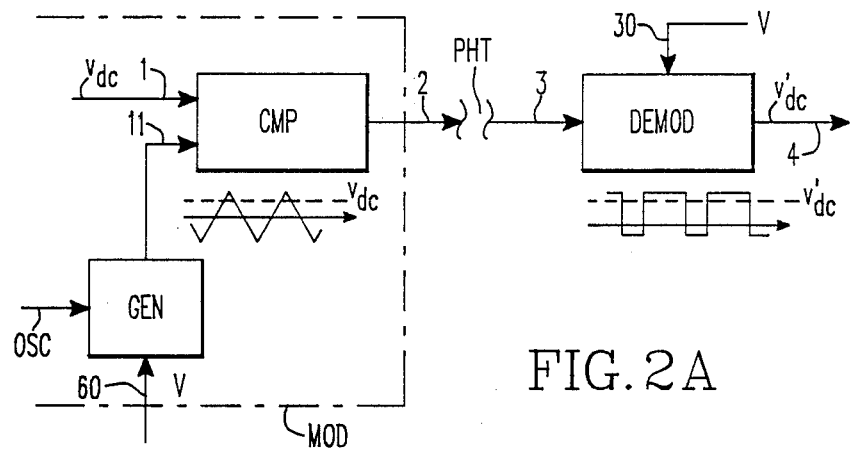
FIG. 2A is a block diagram explaining the modulating and the demodulating functions used in the circuit of FIG. 1.

FIG. 2A shows the modulator circuit MOD of FIG. 1. It includes a triangular-wave generator GEN responsive to an oscillator signal OSC and to the basic voltage V of line 60 for generating on line 11 a triangular wave which is inputted into a comparator CMP together with the signal $v_{dc}$ of line 1 as a reference signal. As a result, on line 2 is outputted a square wave signal having a width depending upon the amplitude of $v_{dc}$. The signal transmitted from line 2 onto line 3, through the photo-electric device PHT, is of the same nature. Demodulator DEMOD is responsive on line 30 to the same voltage V as line 60, used here as the operating voltage in averaging by integration the square wave of line 3. The result is a voltage $v'_{dc}$ on line 4 which is a true rendition of the signal of line 1. Curves are given on FIG. 2B explaining the effect of a change of value of the voltage of lines 60 and 30 from a value V to a new value V'. As shown under (a), the triangular wave generated on line 11 to circuit MOD, which under the voltage V (high +V1, low −V1) was ABCD, becomes under the voltage V' (high +V2, low −V2) A'B'C'D'. As a result, the generated square wave (shown under (b)) has a width which is modified by the new slope of the triangular wave. From aa,bb,cc,dd under the voltage V it becomes a'a',b'b',c'c',d'd' when under the voltage V'. This is what will be passed on alternatively by the photo-sensitive device PHT. However, under the process of demodulation, the area gained in height is exactly compensated by the area lost in width, so that beyond the DEMOD circuit the average remains the same, and $v'_{dc}$ (of line 4) is proportional to $v_{dc}$ (of line 1).

Figure 3:
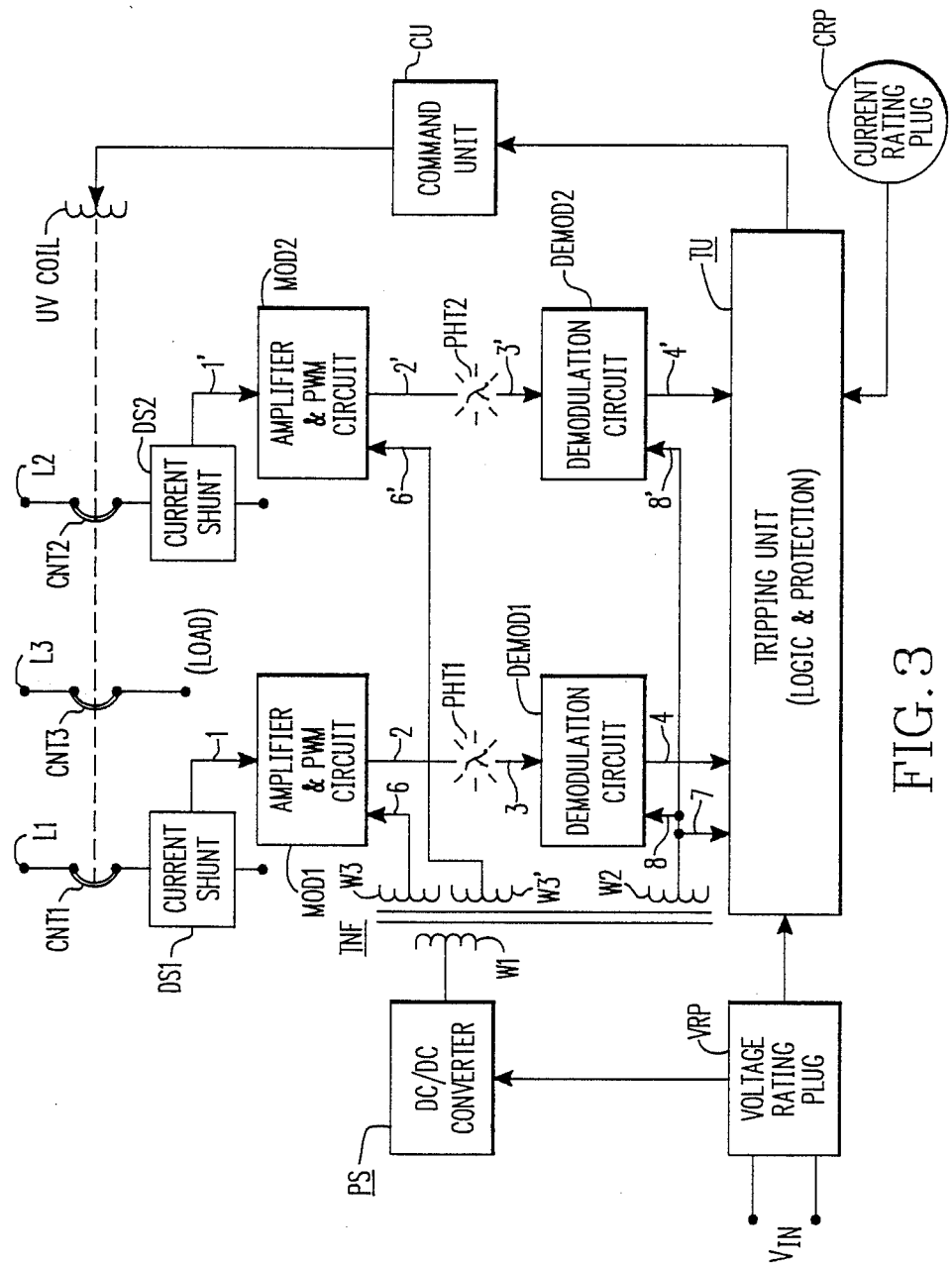
FIG. 3 shows a two-DC sensing unit illustrating the invention in a preferred embodiment thereof.

FIG. 3 shows the preferred embodiment of the invention. Typically, the circuit breaker includes three poles with respective contacts CNT1, CNT2 and CNT3 controlled by a common coil so as to interrupt respective lines L1, L2, L3 connected to a load. The first and the second pole each have a DC shunt (DS1, and DS2, respectively), typically a manganin current shunt such as disclosed in U.S. Pat. No. 4,743,875. A single sensor design is vulnerable to ground faults and wiring errors which can leave the breaker and its load unprotected. The circuit breaker according to the preferred embodiment of the invention is a solid-state trip unit having manganin shunts placed on the outside poles of a three-pole circuit breaker. Typical specifications to be met are as follows:
- the trip unit and the current sensors are mounted inside the housing of the circuit breaker;
- a removable current rating plug is provided designed for continuous current ratings of 600, 700, 800, 1000 and 1200 amperes;
- a removable control voltage rating plug is designed for nominal control voltages of 24, 48, 125, 250, 360 and 500 volts;
- a non-adjustable long delay pick-up is provided with a tolerance band of from 1.05X to 1.25X;
- the long delay function has a I2t inverse time characteristic with a trip time of 19 to 38 seconds at 4X, a long delay memory being included to insure positive tripping under intermittent overload conditions;
- an adjustable instantaneous trip function is provided with settings from 1.5X to 5X the current rating plug, with a tolerance of +/−10%;
- the control voltage input is not polarized;
- the control voltage input has undervoltage protection, with a +/−5% undervoltage trip tolerance;
- a fuse is mounted inside the voltage rating plug which is used for overvoltage protection;
- an undervoltage (UV) trip coil is preferably used to mechanically trip the contacts of the circuit breaker.

In order to accommodate all these requirements, particular attention should be given to compactness within the housing and electrical compatibility and isolation between units brought together and in close functional cooperation.

For current sensing with DS1 and DS2, a manganin shunt element is used having a resistivity of 180 ohms/-mil2/ft and a resistance temperature coefficient of +/−15 ppm/oC. Manganin has a relatively low thermo-emf to copper of +3 microvolts/oC, which permits shunt designs with low millivolt drops at rated current. In the present shunt design, the manganin element is brazed between two copper conductors (L and L′ in FIG. 1) and the potential leads are soldered to terminal lines (1 in FIG. 1) that are attached to the copper adjacent to the manganin element. The shunt is, then, coated with an oxidation preventive agent.

Figure 2B:
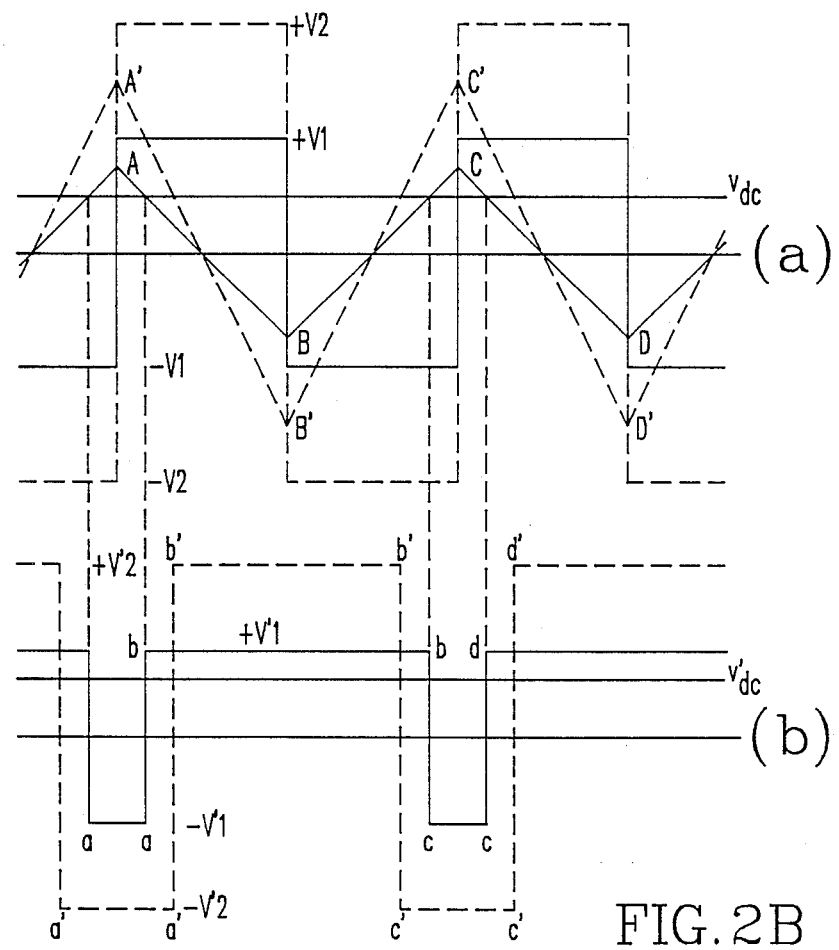
FIG. 2B shows with curves how the signal generated after successive modulation and demodulation remains unaffected by a change of the reference voltage applied thereto.

The circuit breaker shunts are designed to produce a 3 mv output for a 1200 A input. The shunt is merely a resistive sensing element so that the resistance can be directly derived according to the Ohm's law. Knowing the required resistance capability, the physical size of the shunt is determined according to the following equation: $R = p \times 1 \, m/A$, where:
- $p = 15 \times 10^{-6}$ Ohm/in/in2;
- 1 m = shunt length in inches;
- A = cross-sectional area in square-inch;

Shunts DS1 and DS2 are directly connected to the outer poles involving lines L1 and L2 and contacts CNT1 and CNT2, respectively. Thus, typically, one pole may be at +600 v, the other pole at 0 v, with the load thereacross. Therefore, the related circuitry inside the housing must be electrically isolated. Lines 1 from DS1 are connected to an amplifier circuit and a pulse-width modulation circuit MOD1 for generating a signal of predetermined voltage (a ONE interrupted by a ZERO) during variable durations (width) according to the amplitude of the sensed voltage of vdc of line 1. Such pulse-width modulated signal is, then, passed through a photo-electric coupling device PHT1, so that the same signal be carried over onto line 3 with the advantage of electrical isolation between the two sides. The same is done with DS2, line 1′, amplifier and PWM circuit MOD2, line 2′, photo-electric coupling device PHT2, and line 3′. The required 600 volt isolation (in the example) for the circuit is provided by transformer isolation as shown by transformer TNF (primary winding W1 and secondary windings W3 and W3′ for circuits MOD1 and MOD2, respectively. Power for the circuits is provided by the industrial mains, or standby source under voltage $v_{IN}$ which goes through a voltage rating plug, then, to the power supply PS and to the tripping unit TU, separately. The power supply is a DC/AC converter outputting a square pulse voltage to the primary winding W1. Secondary currents are induced into secondary windings W3 and W3′ for MOD1 and MOD2, respectively, and into secondary winding W2 which is used by the tripping unit TU. The three secondary windings provide (by line 6 to MOD1 from W3, by line 6′ from W3′, by line 7 from W2, after rectification, respectively within MOD1, MOD2 and TU) a voltage V which is applied to the electrical components of the associated circuits. As illustrated in FIGS. 1, 2A and 2B, the signal of line 3 is demodulated by a demodulation circuit DEMOD1 and the same is done with the signal of line 3′ by a demodulation circuit DEMOD2. Winding W2 provides by lines 7 and 8 for DEMOD1, by lines 7 and 8′ for DEMOD2, and through a rectifier therein, the voltage V required for DEMOD1 and DEMOD2. The signals of lines 2 and 2′ are accordingly translated into faithful signals on output line 4 from DEMOD1 and on output line 4′ from DEMOD2, to be inputted into the trip unit TU.

Figure 4:
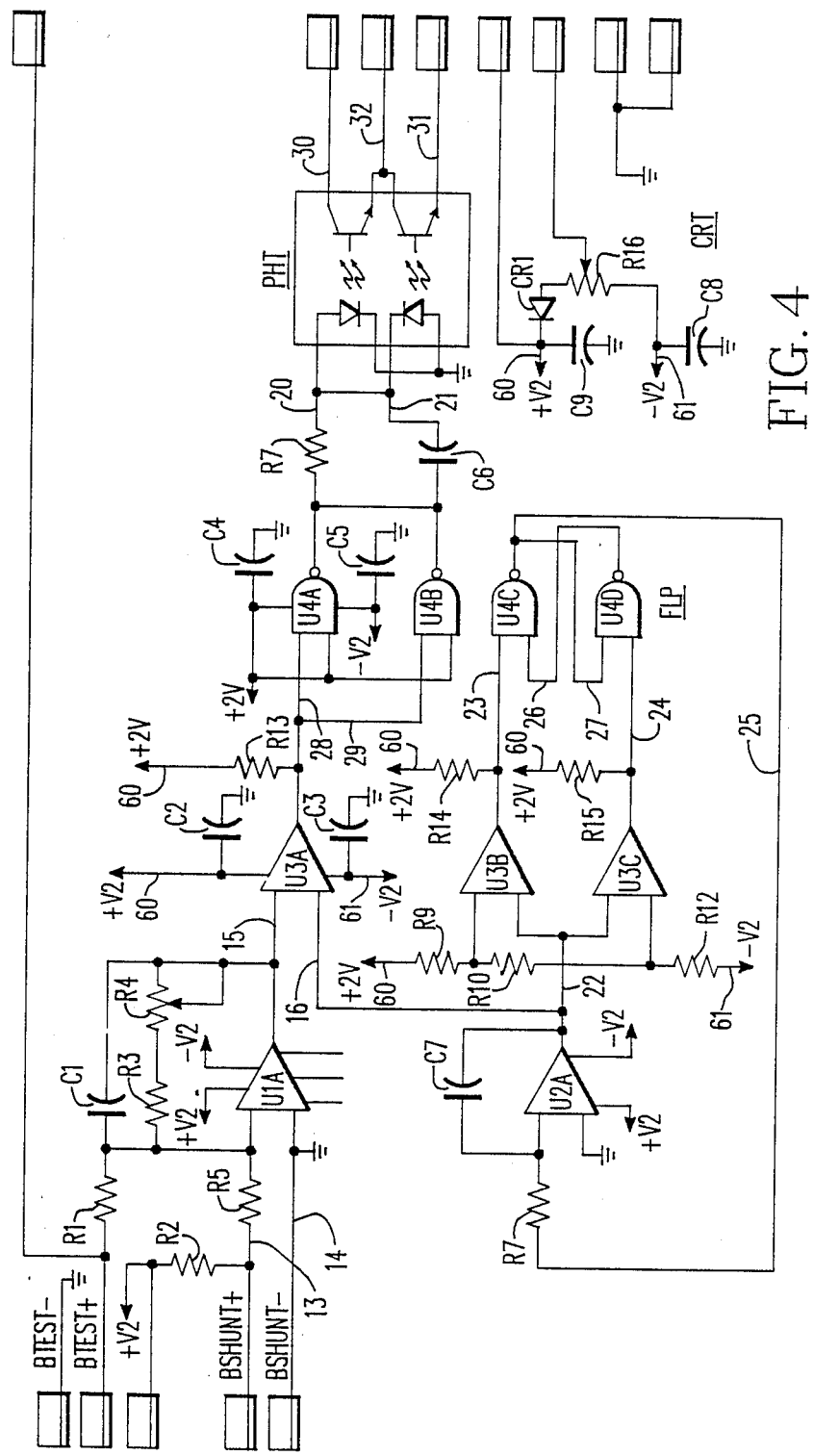
FIG. 4 shows circuitry of one DC sensing circuit as it is combined with a PWM modulator and coupled to a photo coupling unit such as used for the circuit of FIG. 3.

The internal organization of MOD1 or MOD2 will be explained by reference to FIG. 4. The output of each shunt, which can be either positive or negative, is amplified and the signal is pulse-width modulated. Assuming, for instance, that FIG. 4 represents MOD1 operating in response to DS1, lines 13 and 14, corresponding to lines 1 of FIG. 1, are inputted into the respective inputs of inverting amplifier U1A. The gain of U1A can be adjusted from 100 to 125 using potentiometer R4 in the feedback from line 15 (at the output) to line 13 (at the input). The gain of the circuit is adjusted for 0.5 V across the 1200 A current rating plug (CRP in FIG. 3) with a 3 mV input to the current shunt amplifier.

A pulse-width configuration is obtained with an operational amplifier used as an integrator (U2A), with a comparator U3A (triangular wave on line 16 and reference signal on line 15 at the input), and with comparators U3B and U3C operating (from line 22 at the output of the integrator) with NAND devices (U4C and U4D) coupled as a flip-flop FLP. U3B outputs into the ONE input of U4C, whereas U3C outputs into the ZERO input of U4D. By line 25 the logic of the output of U4C is applied to the inverting input of U2A, the output of which goes by line 22 to the non-inverting of U3B and to the inverting input of U3C. A triangular wave of a slope defined by the integrator (U2A and the CR constant C7, R11) is generated on line 22 and applied to comparator U3A receiving the signal of line 15 as a reference signal. The pulse-width modulated signal is outputted by U3A on line 28. Two parallel NAND devices (U4A, U4B with decouplers C4, C5)) are provided responding to line 28. Lines 20 and 21 are the inputs to a pair of photo-electric diodes within photocoupler PHT. Photo-electric transistors respond thereto within PHT to generate on line 32 a positive, or a negative state, depending upon- which transistor is conducting under the applied voltage (+V3 of line 30, or −V3 of line 31). A voltage V2 is applied (line 60 for +V2, line 61 for −V2) to the modulator (MOD1, or MOD2), the derivation being as shown in FIG. 3, and via a rectifier (CR1 and CR2 pertaining to rectifier RCT of FIG. 1). These voltages appear on the operational amplifiers of the afore-stated devices U1A, U2A, U3A, U3B and U3C.

Accordingly, the amplitude input signal $v_{dc}$ of line 15 is applied to pin 7 of U3A with the pulse-width modulated signal appearing at the output, namely on pins 3 and 4 of U4A and U4B, respectively. The reference at the + input of U3B is +4.6 v and the − input of U3C is −4.6 v. At start-up, if pins 4 and 9 of U3B and U3C (by line 22) are at −7 v, then, the output of U3B will be at +7 v and the output of U3C will be at −7 V, resulting in a −7 v output at pin 10 of flip-flop FLP (U4C and U4D). The output of the flip-flop is connected by line 25 and via resistor R11, to the input of U2A. U2A, R11 and capacitor C7 (on the feedback line around an operational amplifier) form an integrator having its output fed by line 22 into the inputs of comparators U3B, U3C. The output of the integrator (lines 22 and 16) increases linearly until the +4.6 v reference at U3B (from line 60) is exceeded. At that moment, the output of U3C is at +7 v and the output of U3B switches to −7 v resulting in +7 v at the output of the flip-flop (pin 10 and line 25). The input of the integrator being now at +7 v, its output (lines 22 and 16) starts decreasing linearly. When the input to the comparators (line 22) becomes less than −4.6 v (the reference being from line 60 for U3C), the output of U3C switches to −7 v, and the cycle repeats itself. A triangular wave is generated on lines 22 and 16. Comparator U3A uses the signal of line 15 as a reference with respect to the triangular wave of line 16, with the result that a pulse-width modulated signal appears on pins 3 and 4, which is proportional to the current flowing in the manganin shunt.

A PWM signal, as just described, is obtained for each sensor (DS1, DS2). The signals and their inverses are filtered, then auctioneered so as to produce, across the current rating plug CRP (FIGS. 3 and 6), a voltage which is proportional to the largest DC current magnitude being sensed. The trip unit TU has three trip functions: 1/ it develops a long delay function that is proportional to $I^2m$; 2/ it provides an instantaneous trip function that is adjustable from 1.5X to 5X the current rating plug value; and 3/ it has an undervoltage trip function. A resistor in the voltage rating plug determines the undervoltage trip setpoint. The output of the protection circuit controls the undervoltage trip coil which mechanically trips contacts CNT1-CNT3 of the circuit breaker.

Referring still to FIG. 4, within photo-electric coupler PHT at the receiving end there are two light sensitive transistors connected in series between positive and negative potential lines 30 and 31 with the emitter electrode of one connected to the collector electrode of the other and a common line 32 carrying the logic established by the conductive one of the transistors in accordance with the transmitted pulsed-width signal of lines 20 and 21. Device U5 forming such two-polarity photoelectric coupler is sold on the open market as a MCT6.

Figure 5:
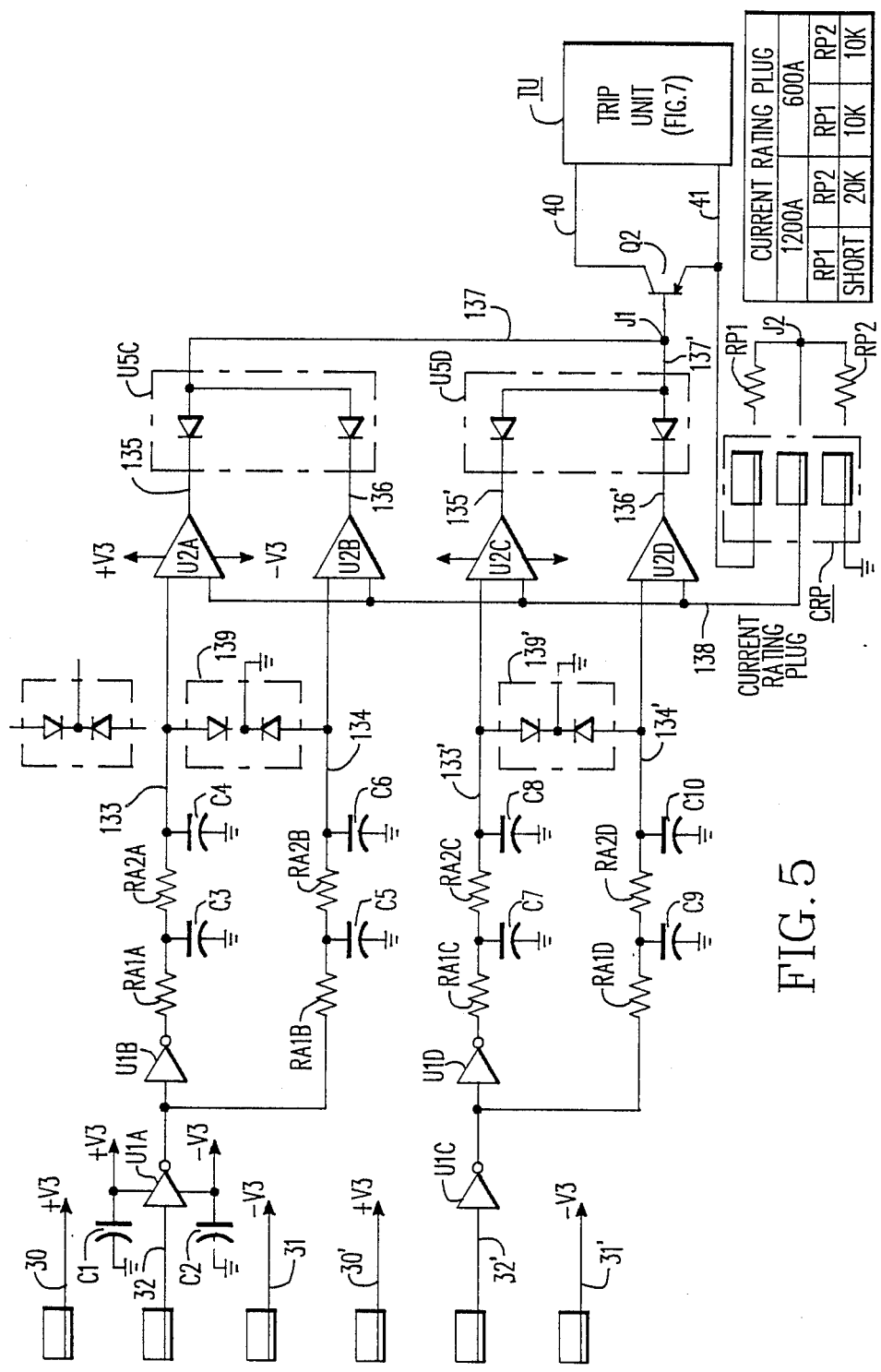
FIG. 5 shows the two demodulator circuits responsive to the PWM modulator signals of FIG. 4 after they have been passed through their respective photo-coupling units, and the auctioneering circuit is also shown controlling the tripping unit.

Referring to FIG. 5, the demodulator circuits DEMOD1 and DEMOD2 are shown with the operative voltage (+V3, −V3) applied to all operational amplifiers, as obtained from winding W2 of transformer TNF, by lines 7 and 8 (or 7 and 8') after rectification by a rectifier RCT, like the one shown in FIG. 4. This is also the voltage applied by lines 30 (+V3) and 31 (−V3) to the extreme electrodes of the two serially-connected photoelectric transistors (within PHT1 for DEMOD1) and by similar lines (30' and 31') for the other photocoupler (within PHT2 for DEMOD2). For DEMOD1, U1A of FIG. 5 responds to lines 30, 32 and 31. For DEMOD2, U1C responds to similar lines 30', 32' and 31'. In DEMOD1, the output of U1A is filtered by resistors RA1B, RA2B, and capacitors C5 and C6 to produce a DC voltage on line 134 at the + input of comparator U2B which is proportional to the current shunt signal $v_{dc}$ of line 1. The output of U1A is also inverted by U1B and the inverse signal is also filtered (by resistors RA1A, RA2A and capacitors C3 and C4) to produce a DC voltage on line 133 at the +. input of comparator U2A. Similarly for DEMOD2 the output of U1C is filtered by RA1D, RA2D, C9 and C10 to produce a DC voltage on line 134' at the input of U2D which is proportional to the current shunt signal $v_{dc}$ of line 1' The output of U1C is also inverted by U1D and the inverse signal is filtered by RA1C, RA2C, C7 and C8 to produce a DC voltage on line 133' at the + input of U2C. Comparators U2A, U2B, U2C and U2D make use of operational amplifiers of the type sold on the open market as LF444. They are used as comparators with a common reference signal on line 138, as derived from the current rating plug CRP. One of the four signals of lines 133, 134, 133' and 134' appears at junction point J1, the latter being connected to the base electrode of a transistor Q2. This device is the last element of an auctioneering circuit comprising comparators U2A, U2B, U2C, U2D, respective output lines thereof 135, 136, 135' and 136', and two rectifiers, one U5C for lines 135 and 136 in the DEMOD1 section, the other U5D for lines 135' and 136' in the DEMOD2 section, each including one diode per input line (a device known as CA3141E). In operation, one of the four signals of lines 133, 133', 134, 134', the one which has the most negative signal will cause its output to decrease until it becomes equal (in one of the comparators U2A, U2B, U2C, U2D) to the voltage across the current rating plug resistor RP2. This results from the feedback connection, via line 138 from the CRP, to the negative input of U2A, U2B, U2C and U2D. When such auctioneered voltage appears upon the base electrode of Q2, the latter becomes conductive and current developed across resistor RP1 of the current rating plug appears along line 40, which is the signal critical as sensed for tripping by the trip unit TU.

The circuit breaker uses the current rating plug so that it can be designed for a single current shunt design, the plug being adjusted for the required rating in practice. The removable current rating plugs are designed to provide continuous ratings of 600, 700, 800, 1000 and 1200 amperes when 1200 ampere current shunts (DS) are mounted in the circuit breaker. FIG. 6 shows the current rating plug with its three lines 138, 138' and 138" in a star connection with resistors RP1 (between lines 138 and 138') and RP2 (between lines 138 and 138"). The values of RP1 and RP2 determine the current rating according to the following table:

TABLE I

| Rating | RP1 | RP2 |
| --- | --- | --- |
| 1200 A | Zero Ohms | 20 K |
| 1100 A | 1.82K | 1.82K |

TABLE I-continued

| Rating | RP1 | RP2 |
| --- | --- | --- |
| 1000 A | 3.48K | 16.5K |
| 900 A | 4.99K | 15.8K |
| 800 A | 6.65K | 13.3K |
| 700 A | 6.25K | 13.3K |
| 600 A | 10.0K | 18.8K |

The current rating plug has two functions. It develops a −0.5 volt per unit signal ($V_{rp}$) on line 41 which is the input of the long delay and instantaneous trip function within the trip circuit TU, and it develops a −25 microampere per unit signal ($I_{rp}$) on line 40 which is the input to the squaring function w the trip circuit TU.

Figure 7:
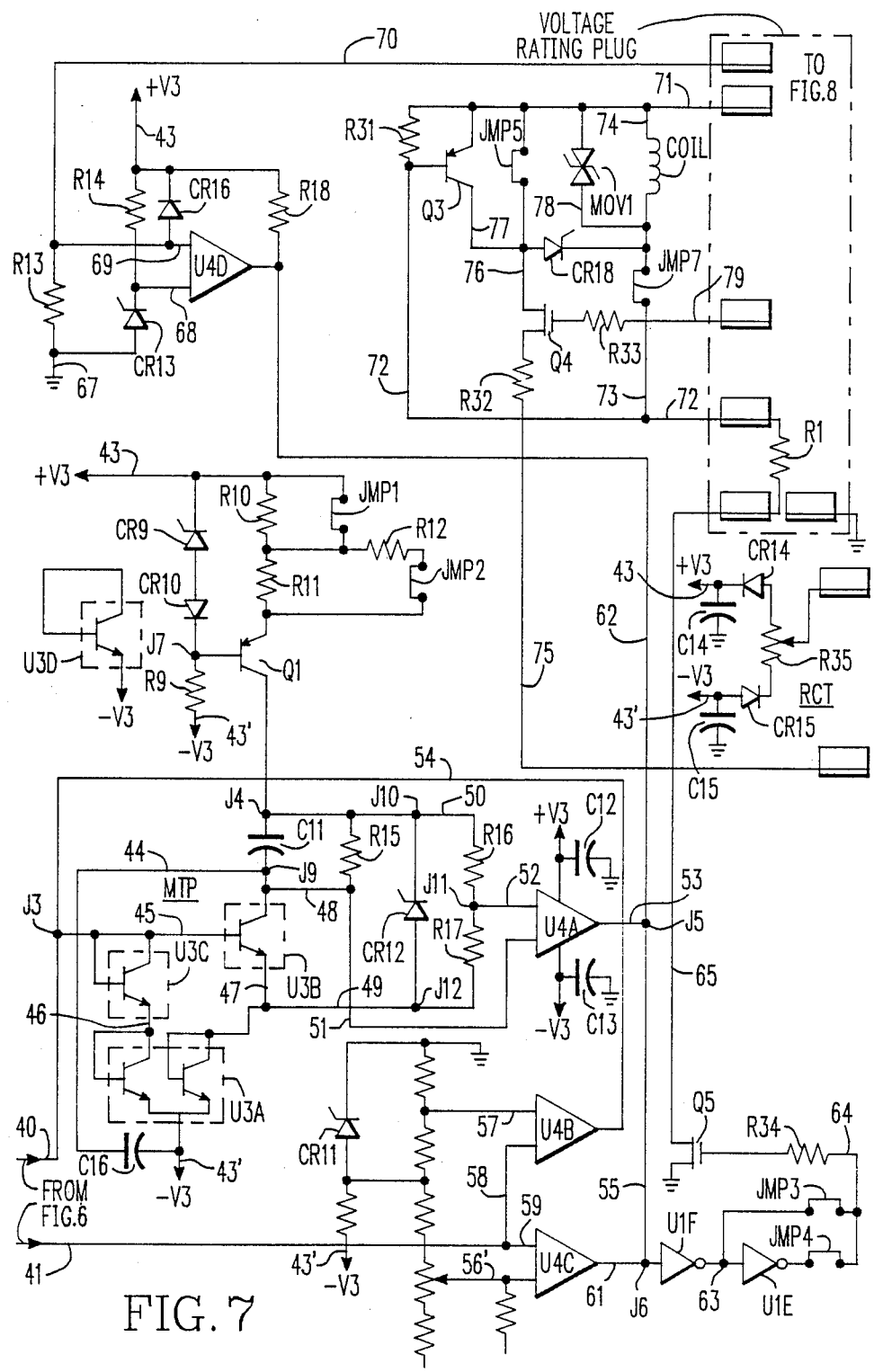
FIG. 7 shows the tripping unit circuitry which is responsive to the control signal of FIG. 5.

Referring to FIG. 7, the logic and protection functions of the trip unit will now be considered by reference to specific circuitry as shown.

Line 41 is the input line to the long delay pick-up section including two comparators U4B and U4C. Line 41 is inputted by line 58 into the negative input of U4B, and it is inputted by line 59 into the positive input of U4C. The reference voltages are developed on opposite lines (57 and 56') under common applied voltage V3, with the references voltages being derived through resistors as shown. Zener diode CR11 and resistors R19, R20 and R21 provide a −0.575 volt reference on line 57. When the voltage ($V_{rp}$) of lines 41 and 58 is less than the reference (line 57), the open collector output of U4B, on line 54, goes to a high impedance state allowing current ($I_{rp}$) to flow from line 40 (out of the collector of transistor Q2 of FIG. 6) at junction J3 into the multiplier circuit formed by transistors U3A, U3B, U3C and CR12. These are part of a four-transistor chip, known as the CA3886. This integrated circuit has been described in IEEE Journal of Solid-State Circuits Vol. SC-3, no 4, Dec. 1968 on pages 353-365 under the title "A New Wide-Band Amplifier Technique" by Barrie Gilbert, and on pages 365-373 under the title "A Precise Four-Quadrant Multiplier With Subnanosecond Response" by Barrie Gilbert. These two articles are hereby incorporated by reference. The long delay pick-up is non-adjustable. The pick-up tolerance band is from 1.05 to 1.25 times the ampere value of the plug rating.

Considering the long delay time function of FIG. 7, when a long delay pick-up occurs, the input current $I_{rp}$ flows from line 40 into pin 11 of transistor U3C which is the input of the multiplier circuit formed by transistors U3C, U3A and U3B in cooperation with zener diode CR12. The square value $I^2_{RP}$ appears on lines 48 and 51. A reference current $I_{ref}$ is provided for the multiplier at junction J4 by transistor Q1, the base of which rests on junction J7, between voltage −V3 and resistor R9, on the one hand, and zener diode CR9 in series with diode CR10 and voltage +V3, on the other hand. The emitter of Q1 is under the voltage +V3 and resistors R10, R11 and R12, while the collector passes the reference current $I_{ref}$ onto junction J4. The +V3 and −V3 voltages are applied by lines 43 and 43', respectively. This is a current source providing $I_{ref}$ at its output on junction J4. Between junctions J4 and J9 is a capacitor C11 which is charged by the reference current (at J4) as well as by the output current $I^2_{rp}$ (at J9) from the multiplier. Therefore, the collector of U3B receives a resulting charging current $I_{chg}$ according to the equation:

$$i_{chg}=i^2_{rp}/i_{ref}$$

The current $i^2_{rp}$ from junction J9 and lines 48, 51 is compared by U4A with the reference $i_{ref}$ of lines 50 and 52 derived from junctions J4 and J10. As the current $I_{chg}$ in capacitor C11 charges the same with time, the voltage across it increases. Therefore, by lines 48 and 51, the voltage at the positive input of comparator U4A decreases until it falls below the reference voltage of line 50, junction J11 and line 52, at the negative input of comparator U4A. When this occurs, the output thereof (pin 2) on line 53 and junction J5, goes to −7 volts. This is the trip signal. It is carried over by line 55 to junction J6 at the input of an inverter U1F which is the input toward the undervoltage coil UV of the trip coil circuit.

Long delay memory is provided by resistor R15 and capacitor C11 (between J4 and J9) having a RC time constant slowly discharging the timing capacitor, should a long delay pick-up signal vanish before long delay trip occurs.

The circuit of FIG. 7 also shows adjustable instantaneous pick-up. The voltage across the current rating plug CRP ($v_{rp}$) is applied by line 41 to the positive input of comparator U4C. There, zener diode CR11 and resistors R21 to R25 provide an adjustable reference (between −0.75 v and −2.5 v) at the negative input of U4C. An instantaneous trip occurs when the voltage across the rating plug ($v_{rp}$) is less than the reference voltage set by instantaneous potentiometer R25. When $v_{rp}$ is less than the reference voltage setting, the output of U4C on line 61 goes to −7 v, and such trip signal is passed via junction J6 to the input of inverter U1F which is the input to the undervoltage (UV) trip coil circuit. The UV trip coil circuit is shown on the upper side of FIG. 7. There are shown terminals 1 to 7 which are connected to corresponding terminals of the voltage rating plug printed circuit board shown in FIG. 8. Pick-up is determined by resistor R2 of the voltage rating plug VRP applied, by terminals 4 and 5, between lines 72 and 65 when mosfet device Q5 is conducting in response to the signal at J6 as carried over on lines 63 and 64. When the voltage input falls below the pick-up value, the voltage at the positive input (line 69) of comparator U4D will be less than the 5.1 v reference provided by Zener diode CR13, and a trip condition occurs (the output of U4D on line 62 going to −7 v. The −7 v trip signal (junction J6) is connected to the input of inverter U1F which is the input of the UV trip coil circuit.

FIG. 8 shows the voltage rating plug VRP and the associated input voltage VIN. The terminals of the printed circuit board, there shown, are given numerals 1 to 5 and 8 which match corresponding terminals of the printed circuit board of FIG. 7. Resistor R1 (between terminals 4 and 5) of FIG. 8 forms a voltage divider with resistor R13 of FIG. 7 for the base electrode of transistor Q3 which determines whether the UV coil is energized, or not (the latter meaning tripping of contacts CNT1, CNT2 and CNT3). The voltage rating plug of FIG. chosen from TABLE II herebelow:

TABLE II

| VOLTAGE RATING PLUG | | | R1 | R2 | R3 | R4 | CR1 | TZ1 | F1 | RS1 |
| --- | --- | --- | --- | --- | --- | --- | --- | --- | --- | --- |
| MIN | NOMINAL | MAX | | | | | | | | |
| 16 V | 24 V | 40 V | SHORT | 110K.¼W | 10K.¼W | 6.8K.¼W | 1N4106 | 1N6286CA | LIF255.250 | NONE |

TABLE II-continued

| VOLTAGE RATING PLUG | | | | | | | | | | |
|---|---|---|---|---|---|---|---|---|---|---|
| MIN | NOMINAL | MAX | R1 | R2 | R3 | R4 | CR1 | TZ1 | F1 | RS1 |
| 30 V | 48 V | 60 V | 180.2W | 274K.½W | 68.1K.½W | 13.3K.½W | 1N4106 | 1N6290CA | LIF255.250 | NONE |
| 60 V | 125 V | 180 V | 56.2K.1W | 619K.½W | 150K.½W | 30K.2.5W | 1N4114 | 1N6303CA | LIF255.250 | NONE |
| 160 V | 250 V | 300 V | 39K.1.6W | 392K.½W | 91K.1.6W | 27K.2.5W | 1N4114 | 1N6303CA | LIF255.250 | 3K.10W |
| 270 V | 360 V | 450 V | 39K.1.6W | 392K.½W | 91K.1.6W | 27K.2.5W | 1N4114 | 1.5KE250A | LIF255.250 | 5.62K.15W |
| 400 V | 500 V | 600 V | 39K.1.6W | 392K.½W | 91K.1.6W | 27K.2.5W | 1N4114 | 1.5KE250A | LIF255.250 | 9.09K.20W |

The series resistors R2, R3 connect respective terminals 1 and 3 to their node point and from there to terminal 2. A Zener diode CR1 (type 1N4 106 for the two first lines of the TABLE and type 1N4 114 for the remaining lines thereof) is connected across terminals 3 and 6, while resistor R1 is between terminals 4 and 5. The voltage $V_{IN}$ is applied to a diode bridge BR1 (type VM68) protected at the input against spikes and other disturbances by a bilateral transorb device TZ1 (type LTF 255.258). The diode bridge is connected to the junction of R2 and R3 and to terminal 6 of the printed circuit board.

As shown in the TABLE, nominal DC control voltages are 24 v, 48 v, 125 v, 250 v, 260 v and 500 v. The maximum and minimum values are also shown. The function of the voltage rating plug is 1/ to select the overvoltage trip value; 2/ to select the undervoltage trip value; 3/ to rectify the non-polarized DC input; and 4/ to set the output of the voltage regulator. Control power is supplied to the trip unit through a fuse F1. If an overvoltage condition occurs, the breakdown voltage of TZ1 will be exceeded causing fuse F1 to open. Resistor R2 is selected to calibrate the undervoltage trip setting which is based on the minimal control voltage of the rating plug. Diode bridge BR1 rectifies the DC control voltage applied to the non polarized input terminals 1,2,6 to the trip unit (FIG. 7). A lamp LED1 is mounted on the front of the rating plug to indicate fuse condition and power ON/OFF. Resistor R3 and zener diode CR1 are selected to provide a reference for the voltage regulator transistor Q4 of FIG. 7.

In the 24 v and 48 v rating, resistor R1 is used as a voltage dropping resistor to reduce the power dissipation in the trip coil. In the 125 v to 500 rating, resistor R1 sets the base current of transistor Q3 in the trip coil circuit.

When configured for 24 v and 48 v operation, in the regulator and trip coil circuit, Q4, R3, and CR1 are connected as a +8 v series voltage regulator. The regulated output is supplied to the DC/DC converter circuit. Then, the undervoltage trip coil circuit is connected in parallel with the input to the voltage regulator circuit. When the trip input is at −7 v, indicating a no trip condition, mosfet Q5 is turned ON through the inverter U1E. When mosfet Q5 is turned ON, the trip coil is energized and the breaker is closed. When +7 v is applied to the trip input, indicating a trip condition, mosfet Q5 is turned OFF and the trip coil current freewheels through the bilateral transorb MOV1 until the energy in the coil is dissipated which causes the undervoltage coil to trip the breaker.

Figure 9:
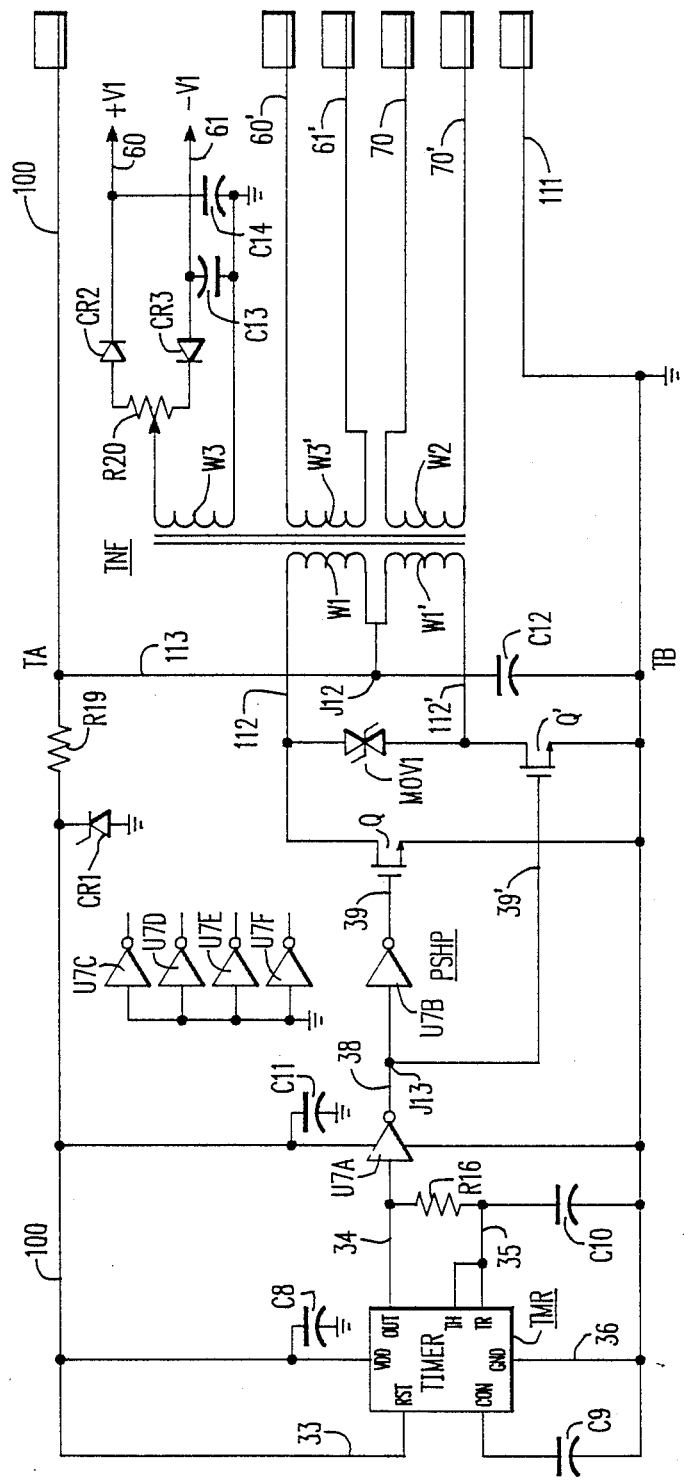
FIG. 9 is the power supply, including a transformer generating the voltages for two circuits like in FIG. 4 and as used in FIG. 3, and also generating the voltages for the tripping unit circuit.

Referring to FIG. 9, circuitry is shown as can be used for providing the power supply for the 125 vDC to the trip unit and the modulation and demodulation circuits according to the present invention. Line 100 at +16 v and line 111 at ground potential establish two terminals TA and TB. A capacitor C12 (10 μF, 25 v) is connected between the two terminals. Transformer TNF is shown to include two primary windings W1, W1' having a common point J12 connected by line 113 to terminal TA and to capacitor C12. A push-pull circuit includes mosfet devices Q and Q' for connecting, when conducting, the outside ends of windings W1 and W1' to ground (TB) alternatively, one by line 112, the other by line 112'. The common point of the two windings is connected to the positive terminal TA by line 113, as earlier stated. A timer TMR (type TLC555) controls the frequency of conduction of Q and Q'. More specifically, capacitor C10 and resistor R16 determine the time constant of the timer. The outputted clock signal on line 34 passes an inverter before reaching junction J13 from which it controls Q' by line 39' and, after inversion Q by line 39. A transorb device joins lines 112 and 112'. As a result, a square wave voltage is applied to the primary of the transformer and a square wave current is outputted by the secondary windings. Secondary winding W2 goes by lines 70, 70' to terminals which are to be connected to the trip unit (line 7 in FIG. 1) where a rectifier CRT generates the voltages +V3 and −V3 applied by lines 43, 43' (FIG. 7). Secondary winding W3 goes by lines 60, 61, to one of the modulators (MOD1 and line 6 of FIG. 3), thereby generating through another rectifier CRT the voltages +V2 and −V2 applied by lines 60 and 61 in FIG. 4. The same can be said for winding W3' and lines 60' and 61', regarding modulator MOD2 of FIG. 3. This converter circuit is configured for 125 v through 500 v rating plugs. The input is derived from the +8 v output of the control voltage regulator. The timer is configured for a stable mode by resistor R16 and capacitor C10, so as to produce a 7-kHz square wave. The transformer has a winding ratio of 1:1:1:1:1. The three output windings are rectified and filtered to provide isolated DC supply to the trip unit and pulse-width modulation and demodulation circuits. As explained by reference to FIG. 1, according to the present invention, transformer TNF and photo-coupler PHT provide electric isolation for the trip unit from the DC shunt. In addition, while using pulse-width modulation for transmitting the DS sensed signal onto the trip unit side for command, any unbalance or variation in the voltage V applied to the units will be exactly compensated by the applied PWM demodulation unit so that the command signal for the trip unit will be a faithful rendition of the sensed signal. Transformer TNF tracks such change of voltage and passes from one winding to the other the same square wave reference that it be on the modulating side, or on the demodulating side, and the same square wave is used also for the trip unit circuit proper.

Figure 10:
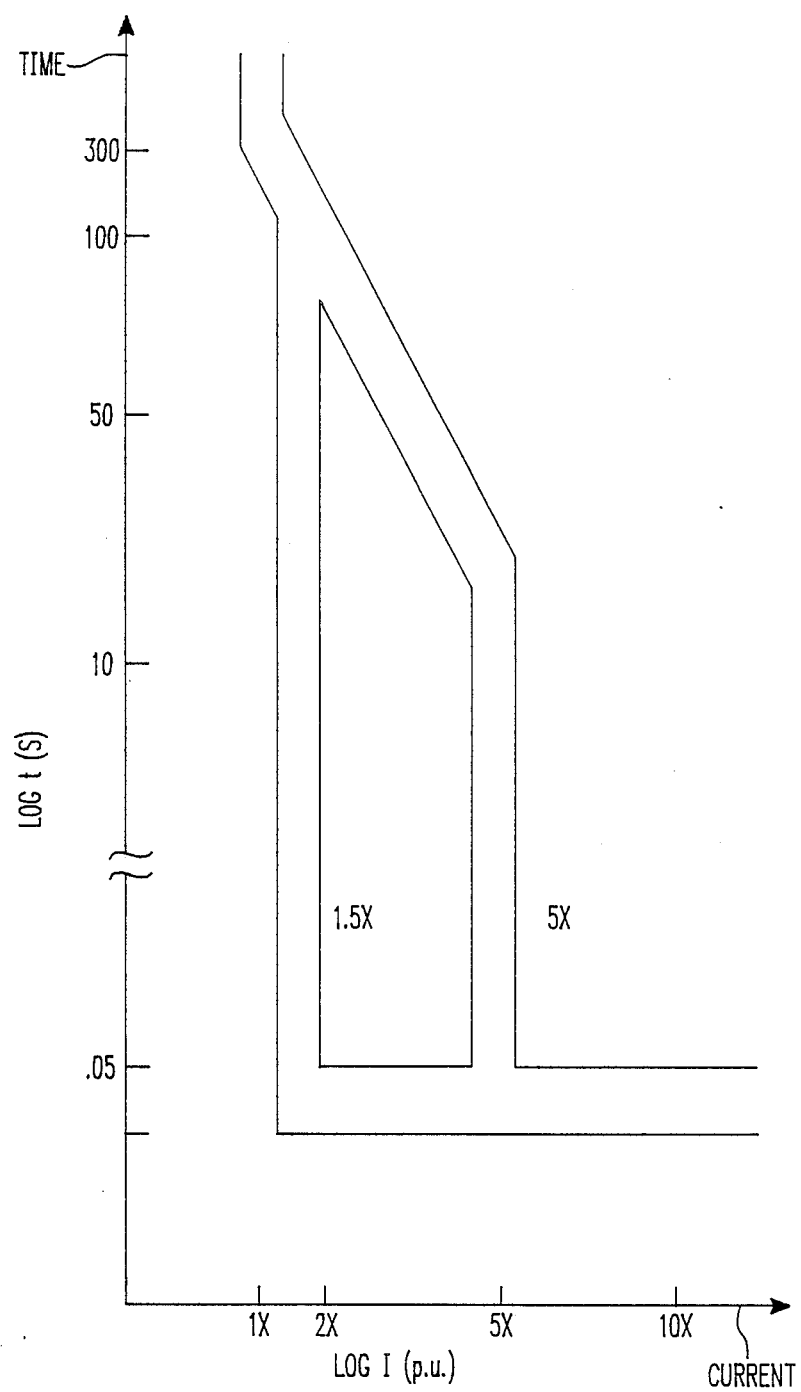
FIG. 10 shows curves characterizing a typical time-current characteristic of a circuit breaker as can be used with the present invention.

FIG. 10 illustrates a per-unit inverse-time characteristic for a circuit breaker embodying the present invention. Within the lowest current range, a very large time delay is allowed (typically above 120 seconds) for tripping under a Long Delay Pickup (LDPU) condition. There is an acceptable limit chosen by the user in accordance with a predetermined operative function of the load, or line. When the line current reaches such limit (defined by vertical A'B' in FIG. 1), pickup occurs and, after the given time delay (also set by the user) tripping is triggered. Following such LDPU pickup condition, takes place, along B'C' and BC in FIG. 1, a Long Time Delay function provided in the trip unit of the circuit breaker. The Long Time Delay accounts for the duration of overcurrent and, therefore, for the exposure of the load, or line, to heat. This is known in the art as the $I^2t$ function, or thermal image of the load, or line, under the wattage applied continuously. Typically, the delay ranges between 10 and 100 seconds when the current ranges from Log I=1 to Log I=5. The LDT characteristic is within the band defined by B'C' and BC. The circuit breaker may also include a Short Delay Pickup function, as shown by C'D' and CD in FIG. 1 (typically adjustable between Log I=2 and Log I=8, and illustrated as placed about Log I=5). Other functions are shown at D'E' and DE (below 1 second) and at F'G' and FG for all larger currents above Log I=10, with instantaneous tripping.

We claim:

1. In a circuit breaker having a housing, within the housing coil-actuated contacts connected to an electrical line for protection of a load supplied by said line;

the housing containing at least one line current sensor for outputting a voltage signal representative of the current flowing in the line and solid state trip unit means responsive to said voltage signal for actuating said coil to trip the circuit breaker when the voltage signal exceeds a predetermined reference level;

a power supply being provided for supplying an operative DC voltage for said trip unit means;

the combination of:

means for pulse-width modulating said sensor voltage signal to derive a pulse-width modulated signal representative thereof;

photo-coupling means responsive to said pulse-width modulated representative signal for outputting a pulse-width modulated translated signal;

means for converting said translated signal into a second voltage signal as an input signal for said trip unit means;

the power supply including means responsive to a DC voltage source for generating in relation to said DC voltage a square-wave voltage of predetermined frequency;

a transformer having primary winding means responsive to said square-wave voltage and secondary winding means responsive thereto for outputting a square-wave current;

said modulating means including first rectifier means responsive to said square-wave current for establishing a second DC voltage operative with said modulating means;

said converting means including second rectifier means responsive to said first square-wave current for establishing a third DC voltage operative with said converting means;

said transformer primary and secondary winding means providing in combination with said photo-coupling means electrical isolation for said current sensor from said power supply and said tripping unit means within the housing; and said secondary windings means being effective to translate any variation in the magnitude of said square-wave voltage into a related change in magnitude of said second and third operative DC voltages, and said converting means being effective through said third operative DC voltage to automatically compensate for such magnitude variation, whereby said second voltage signal is a faithful translation of said sensor voltage signal.

2. The circuit breaker of claim 1 with said housing including:

another line current sensor outputting another voltage signal representative of the current flowing in the line;

another means for pulse-width modulating said another voltage signal to derive a second pulse-width modulated signal representative thereof; and another photo-coupling means associated with said another modulating means for outputting a second pulse-width modulated translated signal in response to said second pulse-width modulated representative signal;

another means being provided for converting said second translated signal into another second voltage signal;

said another modulating means including another first rectifier means responsive to said square-wave current for establishing another second DC voltage operative with said another modulating means;

said secondary winding means outputting another square-wave current;

said another converting means including another second rectifier means responsive to said another square-wave current for establishing another third DC voltage operative with said another converting means;

said transformer primary and secondary winding means being effective in combination with said one and another photo-coupling means to provide electrical isolation for said one and another sensors from one another and to provide electrical isolation for said one and another sensors from said power supply and said tripping unit means;

said secondary winding means being further effective to translate any variation in the magnitude of said square wave voltage into a related change in magnitude of said another second and another third operative DC voltages, and said another converting means being effective through said another third operative DC voltage to automatically compensate for such variation, whereby said another second voltage signal is a faithful translation of said other sensor voltage signal.

3. The circuit breaker of claim 2, with the provision of auctioneering means between said one and another converting means and said tripping unit means for selecting one of said one and another second voltage signals.

4. The circuit of breaker of claim 3 with the provision of a current rating plug for matching said tripping unit means with said second voltage signals.

5. The circuit breaker of claim 4 with a voltage rating plug being inserted at the output of said tripping unit means for matching the operation thereof with the electrical line current.

6. The circuit breaker of claim 5 with said tripping unit means being operable in response to a reference current signal for actuating said coil, said reference current being selected between instantaneous pickup, long delay pickup and short delay pickup in relation to a predetermined line current magnitude characteristic.

* * * * *